US007131457B2

(12) United States Patent
McIntyre et al.

(10) Patent No.: US 7,131,457 B2

(45) Date of Patent: *Nov. 7, 2006

(54) FLOW-THROUGH PRESSURE REGULATOR INCLUDING A PERFORATED DIAPHRAGM-TO-SEAT SPRING RETAINER

(75) Inventors: Brian Clay McIntyre, Suffolk, VA (US); James Archie Wynn, Jr., Virginia Beach, VA (US); Barry Robinson, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 314 days.

This patent is subject to a terminal disclaimer.

(21) Appl. No.: 10/455,722

(22) Filed: Jun. 6, 2003

(65) Prior Publication Data

US 2004/0007267 A1 Jan. 15, 2004

Related U.S. Application Data

(60) Provisional application No. 60/386,535, filed on Jun. 6, 2002.

(51) Int. Cl.
*G05D 16/02* (2006.01)
*G05D 16/08* (2006.01)

(52) U.S. Cl. ....................... 137/508; 123/457; 137/510

(58) Field of Classification Search ................ 137/508, 137/510, 509; 123/457, 460, 511
See application file for complete search history.

(56) References Cited

U.S. PATENT DOCUMENTS 146,716 A * 1/1874 Schmidt ..................... 137/510
2,603,231 A 7/1952 Birkemeier ................. 137/218
2,618,290 A 11/1952 Van Vliet ................... 137/510
4,660,597 A 4/1987 Cowles .................. 137/505.42
5,180,139 A * 1/1993 Gethmann et al. .......... 251/127
5,265,644 A 11/1993 Tuckey ....................... 137/510
5,435,345 A 7/1995 Robinson et al. ........... 137/508
5,901,742 A 5/1999 Kleppner et al. ........... 137/508
5,979,409 A 11/1999 Robinson .................... 123/463
6,016,831 A 1/2000 Bueser et al. ............... 137/315
6,039,030 A 3/2000 Robinson et al. ........... 123/457
6,334,460 B1 * 1/2002 Hem .......................... 137/508
6,343,589 B1 2/2002 Talaski et al. .............. 123/514
6,782,871 B1 * 8/2004 McIntyre et al. ........... 123/457
6,945,265 B1 * 9/2005 Wynn et al. .................. 137/12

FOREIGN PATENT DOCUMENTS

EP 0 636 785 A1 2/1995
EP 1 106 818 A2 6/2001

* cited by examiner

*Primary Examiner*—Stephen M. Hepperle

(57) ABSTRACT

A flow-through pressure regulator includes a retainer that secures a diaphragm relative to a seat, and includes a cylindrical portion, an axial end portion and an annular portion. The cylindrical portion extends about a longitudinal axis and is fixed with respect to the seat. The axial end portion extends from the cylindrical portion and extends generally orthogonal relative to the longitudinal axis. The axial end portion includes a plurality of apertures that permit fluid communication and are selected so as to reduce noise due to fluid flow.

22 Claims, 6 Drawing Sheets

FLOW-THROUGH PRESSURE REGULATOR INCLUDING A PERFORATED DIAPHRAGM-TO-SEAT SPRING RETAINER

CROSS REFERENCE TO CO-PENDING APPLICATIONS

This application claims the benefit of the earlier filing date of U.S. Provisional Application Ser. No. 60/386,535, filed Jun. 6, 2002, the disclosure of which is incorporated by reference herein in its entirety.

FIELD OF THE INVENTION

This invention relates to a pressure regulator for automotive fuel systems, and more particularly to a diaphragm-to-seat spring retainer that is perforated so as to reduce the noise associated with high fuel flow rates through the pressure regulator.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injectors. Metering is carried out using pressure regulators that control the pressure of the fuel in the system at all engine r.p.m. levels.

Fuel flow rate, measured in liters per hour, through known pressure regulators tends to be low at high engine speed, measured in revolutions per minute, as large quantities of fuel are consumed in the combustion process. At low engine speeds, less fuel is consumed in combustion and flow rates through the pressure regulators are high. These high fuel flow rates can produce unacceptably high noise and pressure levels.

A first known pressure regulator, as shown in FIG. 7, includes a spring biased valve seat with a longitudinal flow passage. The longitudinal flow passage, which has a constant cross-section orthogonal to a longitudinal axis, can be modified for length along the longitudinal axis to slightly modify noise and flow performance characteristics.

A second known pressure regulator, as shown in FIG. 8, includes a necked-down longitudinal flow passage and mutually orthogonal cross-drilled holes. The cross-drilled holes disperse fluid flow in a manner that is effective to improve the noise and flow characteristics of the known regulator shown in FIG. 7. However, manufacturing a seat with the necked-down longitudinal flow passage and cross-drilled holes is costly to machine.

It is believed that there is a need for a pressure regulator that is less expensive to manufacture and maintains flow-related noise and pressure within acceptable levels, even at high fuel flow rates.

SUMMARY OF THE INVENTION

The present invention provides a flow-through pressure regulator. The flow-through pressure regulator includes a housing that has an inlet and an outlet that is spaced along a longitudinal axis from the inlet, a divider that separates the housing into a first chamber and a second chamber, and a closure member. The divider includes a seat, a diaphragm and a retainer. The seat defines a passage between the first and second chambers, and the diaphragm extends between the housing and the seat. Fluid communication between the first and second chambers is permitted through the passage, but is prevented through the diaphragm. The retainer secures the diaphragm relative to the seat, and includes a cylindrical portion, an axial end portion and an annular portion. The cylindrical portion extends about the longitudinal axis and is fixed with respect to the seat. The axial end portion extends from the cylindrical portion and extends generally orthogonal relative to the longitudinal axis. The axial end portion includes a plurality of apertures that permit fluid communication between the passage and the second chamber. The closure member may be arranged relative to the seat between a first configuration that substantially prevents fluid communication through the passage and a second configuration that permits fluid communication through the passage.

The present invention also provides a retainer for a flow-through pressure regulator. The flow-through pressure regulator includes a divider, a seat and a diaphragm. The divider separates a housing into a first chamber and a second chamber. The seat defines a passage between the first and second chambers. And the diaphragm extends between the housing and the seat. The retainer includes a cylindrical portion that extends about a longitudinal axis, an axial end portion that extends from the cylindrical portion, and an annular portion spaced along the longitudinal axis from the axial end portion. The axial end portion extends generally orthogonal relative to the longitudinal axis and includes a plurality of apertures. Fluid communication is permitted between the passage and the second chamber through the plurality of apertures. The annular portion extends from the cylindrical portion and outwardly relative to the longitudinal axis.

The present invention also provides a method of regulating fuel flow. The method includes flowing the fuel through a passage that extends along a longitudinal axis, collecting in a chamber the fuel flowed through the passage, and flowing through a plurality of apertures the fuel collected in the chamber. The passage has a first cross-section size orthogonal to the longitudinal axis. The chamber has a second cross-section size orthogonal to the longitudinal axis, and the second cross-section size is greater than the first cross-section size. Each of the plurality of apertures extends generally parallel to the longitudinal axis and has a third cross-section size that is orthogonal to the longitudinal axis. And the third cross-section size is less than the second cross-section size.

The present invention also provides a method of reducing noise in a flow-through pressure regulator. The flow-through pressure regulator includes a divider, a seat and a diaphragm. The divider separates a housing into a first chamber and a second chamber. The seat defines a passage between the first and second chambers. And the diaphragm extends between the housing and the seat. The method includes forming a diaphragm-to-seat retainer, and mounting the retainer with respect to the seat. The forming the retainer includes forming a cylindrical portion extending about a longitudinal axis, forming an axial end portion that extends from the cylindrical portion and extends generally orthogonal relative to the longitudinal axis, and perforating the axial end portion of the retainer so as to reduce noise due to fluid flow. The perforating includes selecting a plurality of apertures and selecting a pattern in which to arrange the plurality of apertures. The mounting the retainer provides a path for fluid flow that includes entering the first chamber, passing from the first chamber through the passage, passing through the plurality of apertures into the second chamber, and exiting the second chamber.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
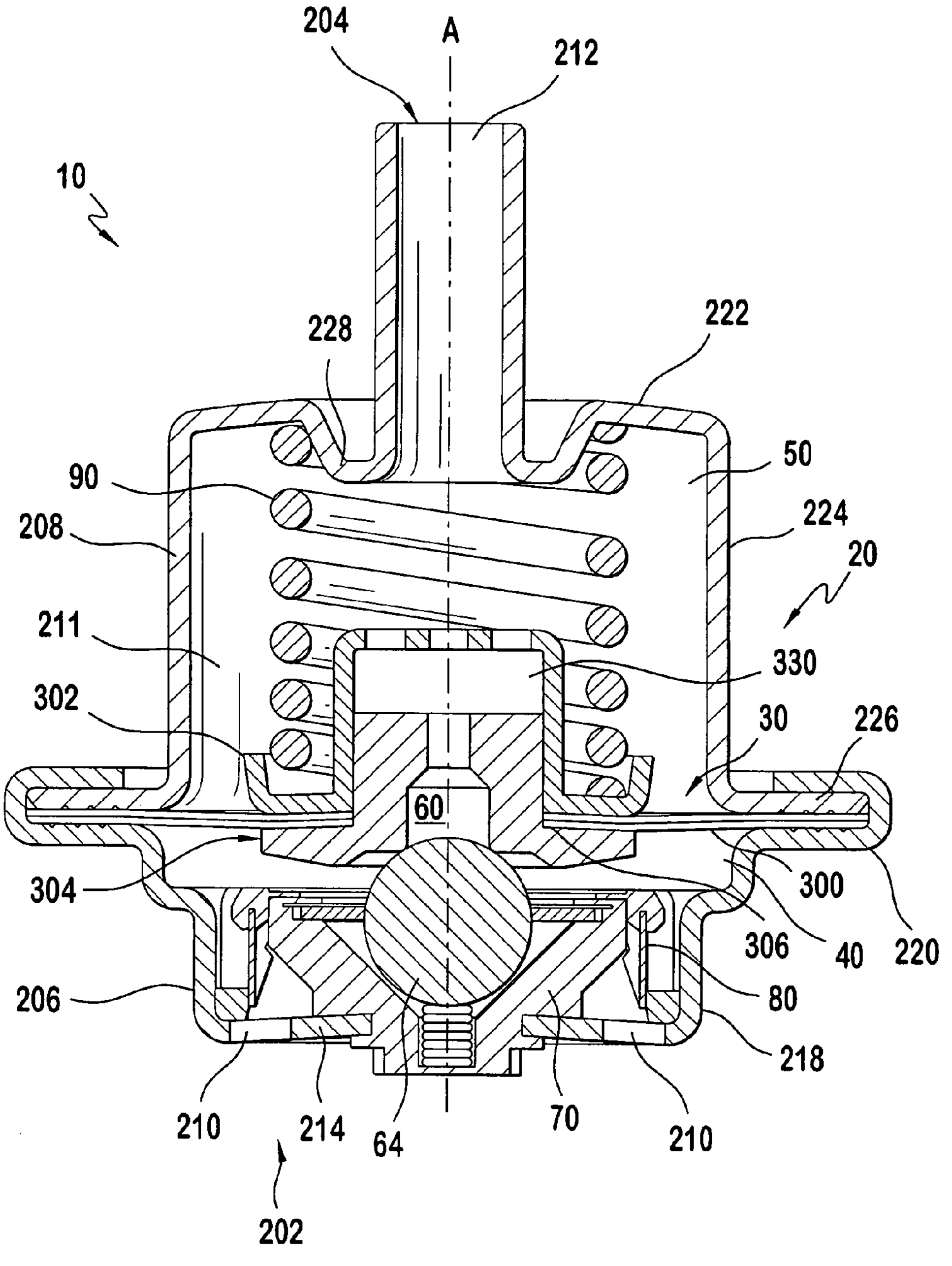
FIG. 1 illustrates a flow-through regulator according to the present invention.

FIG. 1 illustrates a flow-through pressure regulator 10 according to the present invention. The flow-through pressure regulator 10 includes a housing 20. The housing 20 is separated by a divider 30 into a first chamber 40 and a second chamber 50. The divider 30 has a passage 60 that communicates the first chamber 40 with the second chamber 50. A closure member 70 permits or inhibits flow through the passage 60. A filter 80 may be disposed in the flow path of the housing 20. The housing 20 has an inlet 202 and an outlet 204 offset along a longitudinal axis A. The housing 20 can include a first housing part 206 and a second housing part 208 that are crimped together to form a unitary housing 20 with a hollow interior 211. Although the unitary housing is formed by two joined members, it is to be understood that the unitary housing could be formed with multiple members integrated together or, alternatively, a monolithic member. The inlet 202 of the housing 20 is located in the first housing part 206, and the outlet 204 of the housing 20 is located in the second housing part 208. The inlet 202 can be a plurality of apertures 210 located in the first housing part 206. The outlet 204 can be a port 212 disposed in the second housing part 208.

The first housing part 206 can include a first base 214, a first lateral wall 218 extending in a first direction along the longitudinal axis A from the first base 214, and a first flange 220 extending from the first lateral wall 218 in a direction substantially transverse to the longitudinal axis A. The second housing part 208 can include a second base 222, a second lateral wall 224 extending in a second direction along the longitudinal axis A from the second base 222, and a second flange 226 extending from the second lateral wall 224 in a direction substantially transverse to the longitudinal axis A. A divider 30, which can include a diaphragm 300, is secured between the first flange 220 and the second flange 226 to separate the first chamber 40 and the second chamber 50. The first flange 220 can be rolled over the circumferential edge of the second flange 226 and can be crimped to the second flange 226 to form the unitary housing 20.

A first biasing element 90, which is preferably a spring, is located in the second chamber 50. The first biasing element 90 engages a locator 228 on the base 222 of the second housing part 208 and biases the divider 30 toward the base 214 of the first housing part 206. The first biasing element 90 biases the divider 30 of the regulator 10 at a predetermined force, which relates to the pressure desired for the regulator 10. The base 222 of the second housing part 208 has a dimpled center portion that provides the outlet port 212 in addition to the locator 228. The first end of the spring 90 is secured on the locator 228, while a second end of the spring 90 can be supported by a retainer 302, which is secured to a valve seat 304 mounted in a central aperture 306 in the diaphragm 300.

Figure 2:
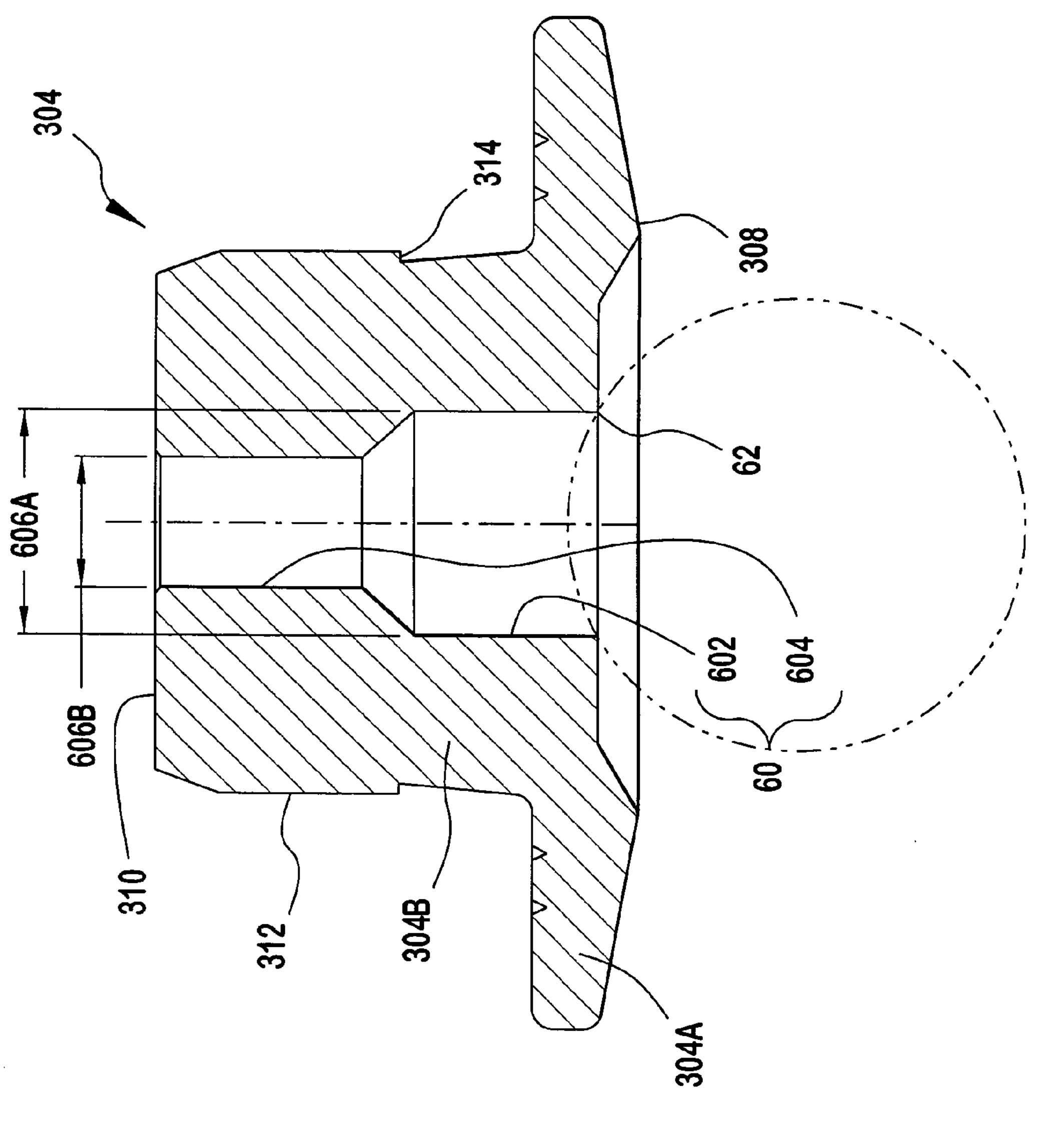
FIG. 2 illustrates a sectional view of the valve seat of the flow-through regulator shown in FIG. 1.

FIG. 2 shows a preferred embodiment of the valve seat 304. The valve seat 304 is suspended by the diaphragm 300 in the housing 20 (FIG. 1), and provides the passage 60 that includes a first section 602 and a second section 604. The valve seat 304 has a first seat portion 304A and a second seat portion 304B disposed along the longitudinal axis A. The first seat portion 304A is disposed in the first chamber 40 and the second seat portion 304B is disposed in the second chamber 50 (FIG. 1). The first section 602 of the passage 60 extends along the longitudinal axis A in both the first portion 304A and the second portion 304B of the valve seat 304. The second section 604, which also extends along the longitudinal axis A, is in the second portion 304B of the valve seat 304.

The valve seat 304 preferably has a first surface 308 disposed in the first chamber 40 (FIG. 1), a second surface 310 disposed in the second chamber 50 (FIG. 1), and a side surface 312 extending between the first surface 308 and the second surface 310. The first section 602 of the passage 60 communicates with the first surface 308. The second section 604 of the passage 60 communicates with the first section 602 and the second surface 310. The first section 602 has a first diameter 606A and the second section 604 has a second diameter 606B that is necked-down from the first diameter 606A, as shown in FIG. 2.

The side surface 312 of the valve seat 304 may include an undercut edge 314 that may enhance the press-fitted connection between the retainer 302 and the valve seat 304.

It should be noted that the valve seat 304 of the present invention can be manufactured as a monolithic valve seat or, alternatively, as separate components that can be assembled. The dimensions illustrated in FIG. 2 are merely exemplary of one preferred embodiment of the valve seat 304.

At an end of the passage 60 opposite the second seat surface 310 is a seating surface 62 for seating the closure member 70, which can be a valve actuator ball 64, as shown in phantom line in FIG. 2. In the manufacturing of the valve seat 304, the seating surface 62 is finished to assure a smooth sealing surface for the ball 64.

Figure 4:
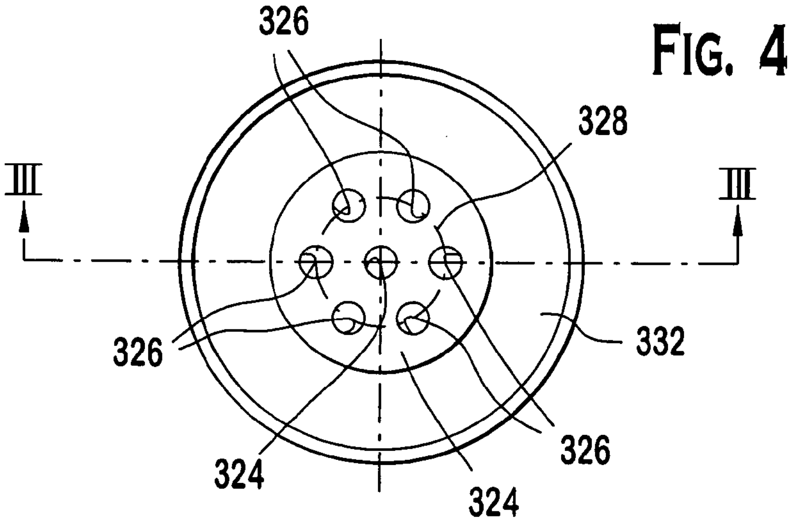
FIG. 4 illustrates a detailed view of the retainer according to the present invention.
Figure 3:
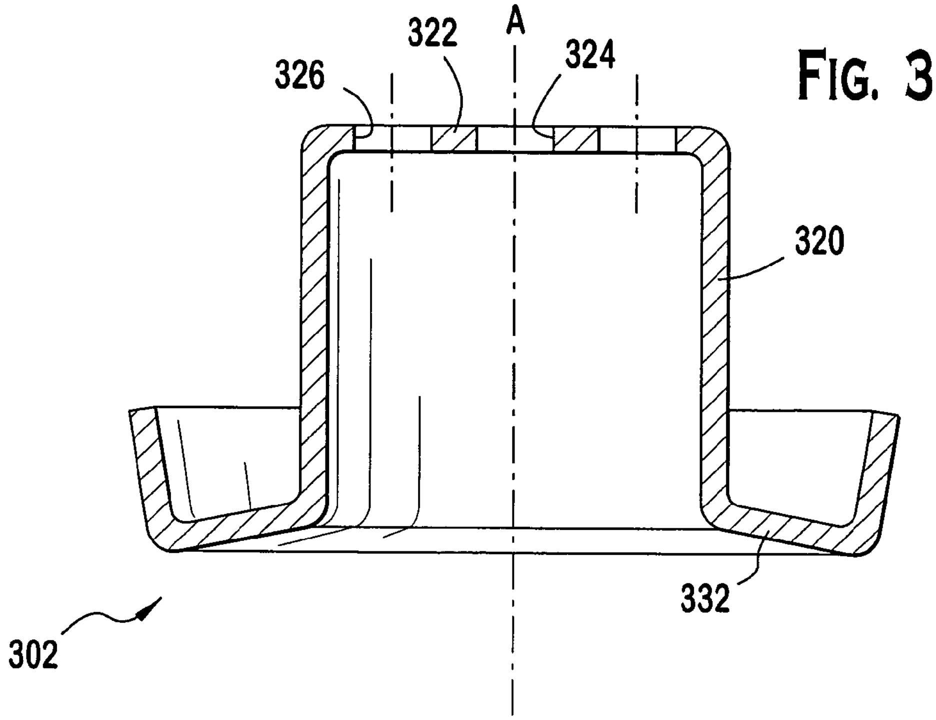
FIG. 3 illustrates a sectional view, taken along line III—III in FIG. 4, of the retainer of the flow-through regulator shown in FIG. 1.

FIGS. 3 and 4 show a preferred embodiment of the retainer 302. The retainer 302 includes a cylindrical portion 320 that extends about the longitudinal axis A. According to a preferred embodiment, an inner surface of the cylindrical portion 320 is press-fitted with respect to the side surface 312 of the seat 304, and may cooperatively engage the undercut edge 314.

The retainer 302 also includes an axial end portion 322 that extends from the cylindrical portion 320 generally orthogonally relative to the longitudinal axis A. The axial end portion 322 includes a plurality of apertures 324,326 through which fluid communication between the passage 60 and the second chamber 50 is permitted.

Referring additionally to FIG. 4, and according to a merely exemplary preferred embodiment with seven apertures, a first aperture 324 is located concentrically with respect to the longitudinal axis A. The six remaining apertures 326 are formed in a circular pattern 328 centered about the longitudinal axis A. According to a most preferred embodiment, each of the apertures 324,326 has a diameter of 1.59±0.02 millimeters, the circle pattern 328 has a diameter of approximately 5.5 millimeters, and six apertures 326 are evenly spaced, i.e., every 60°, about the longitudinal axis A. Additionally, a preferred ratio of the longitudinal thickness of the axial end portion 322 to the diameter of the apertures 324,326 is approximately 0.35.

The inventors have discovered that the noise and flow characteristics through the pressure regulator 10 are responsive to the number/shape/size of apertures 324,326, the pattern of the apertures 324,326 on the axial end portion 322, and the thickness of the axial end portion 322 that is penetrated by the apertures 324,326. Additionally, the inventors have discovered that providing a collection chamber 330 in the fluid flow between the passage 60 and the apertures 324,326 also improves the noise and flow characteristics through the pressure regulator 10.

Referring again to FIG. 3, the retainer 302 also includes an annular portion 332 that extends from the cylindrical portion 320 in a generally radially outward direction relative to the longitudinal axis A. The annular portion 332 is spaced along the longitudinal axis A from the axial end portion 322 and, in cooperation with the first seat portion 304A, sandwiches the diaphragm 300, thereby coupling the diaphragm 300 to the valve seat 304. The retainer 302 also serves to support and to locate the second end of the spring 90 with respect to the divider 30.

The dimensions illustrated in FIGS. 3 and 4 are merely exemplary of one preferred embodiment of the retainer 302.

One method of assembling the fuel regulator 10 is by coupling, such as by staking or press-fitting, the closure member 70 to the first housing part 206. The divider 30 is assembled by locating the valve seat 304 in the central aperture 306 of the diaphragm 300, and then press-fitting the spring retainer 302 with respect to the seat 304 such that the side surface 312 contiguously engages the cylindrical portion 320. The assembled divider 30 is located with respect to the upper flange surface 220 of the first housing part 206. The bias spring 90 is positioned in the spring retainer 302 and the second housing part 208 is then placed over the spring 90. The flange 220 of the first housing part 206 is crimped down to secure the second housing part 208. The first and second housing parts 206,208 and the diaphragm 300 form the first and second chambers 40,50, respectively. The pressure at which the fuel is maintained is determined by the spring force of the bias spring 90.

The operation of the flow-through pressure regulator will now be described. The bias spring 90 acts through the retainer 302 to bias the divider 30 toward the base 214 of the first housing part 206. When the ball 64 is seated against surface 62, the pressure regulator 10 is in a closed configuration and no fuel can pass through the pressure regulator 10.

Fuel enters the pressure regulator 10 through apertures 210 and exerts pressure on the divider 30. When the pressure of the fuel is greater than the force exerted by the bias spring 90, the diaphragm 300 moves in an axial direction and the ball 64 leaves the seating surface 62 of the valve seat member 304. This is the open configuration of the pressure regulator 10. Fuel can then flow through the regulator 10. From the first chamber 40, the fuel enters the first section 602 of the passage 60, and then passes into the second section 604 before entering the collection chamber 330. From the collection chamber 330, the fuel passes through the apertures 324,326 into the second chamber 50 before leaving the pressure regulator through the outlet 204.

As the incoming fuel pressure is reduced, the force of the bias spring 90 overcomes the fuel pressure and returns the valve seat member 304 to seated engagement with the ball 64, thus closing the passage 60 and returning the pressure regulator to the closed configuration.

Experimentation has shown that by designing the apertures 234,236 and/or the collection chamber 330 according to the present invention, a substantially constant noise output level can be achieved from a low fuel flow rate to a high fuel flow rate. Further, the pressure of fuel in the regulator 10 has been found to remain substantially constant or decrease slightly as the fuel flow rate increases from a low fuel flow rate to a high fuel flow rate.

Figure 5:
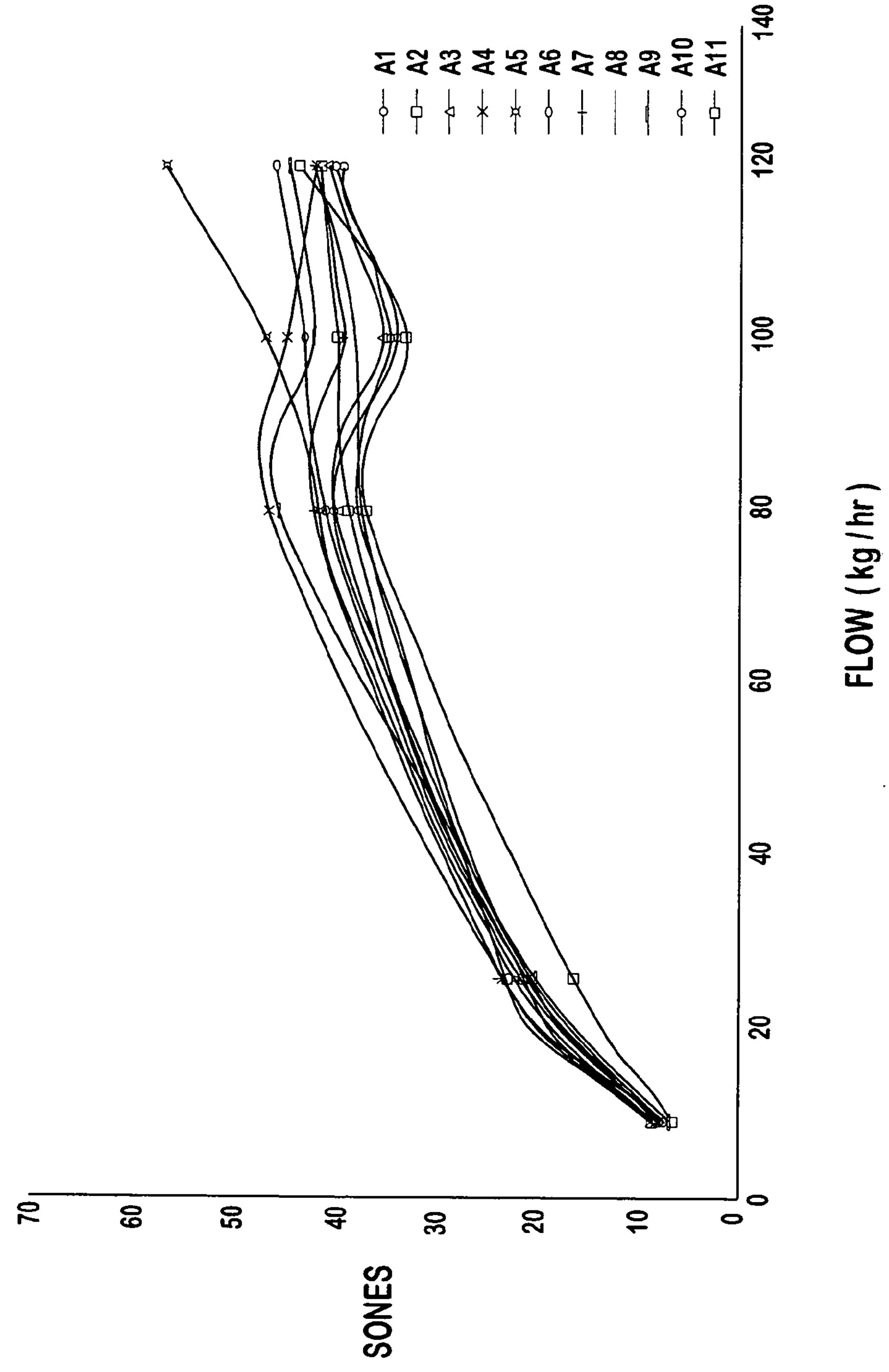
FIG. 5 is a graph illustrating the relationship between noise, measured in Sones, and flow rate, measured in kilograms per hour.

As shown in FIG. 5, curves A3–A7 and A9–A11 show that flow-related noise is kept generally consistent over a range of fuel flow rates using the regulator 10 of the present invention. The performance of the regulator 10 is generally consistent with the performance, as illustrated by curves A1, A2 and A8, of known pressure regulators that do not have the advantages of pressure regulator 10, e.g., ease of manufacture and reduction in cost.

Figure 6:
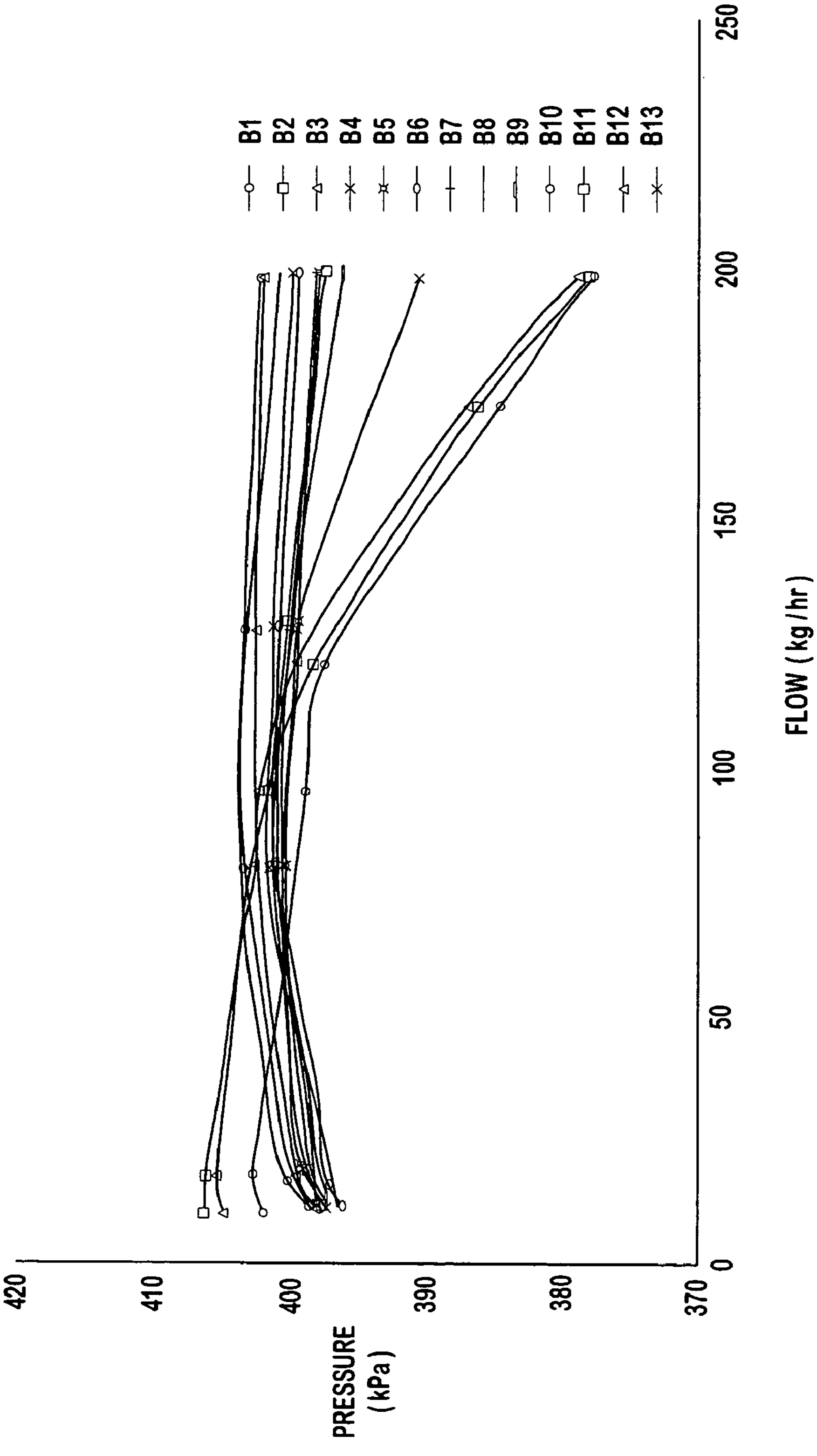
FIG. 6 is a graph illustrating the relationship between pressure, measured in kilopascals, and flow rate, measured in kilograms per hour.
Figure 7:
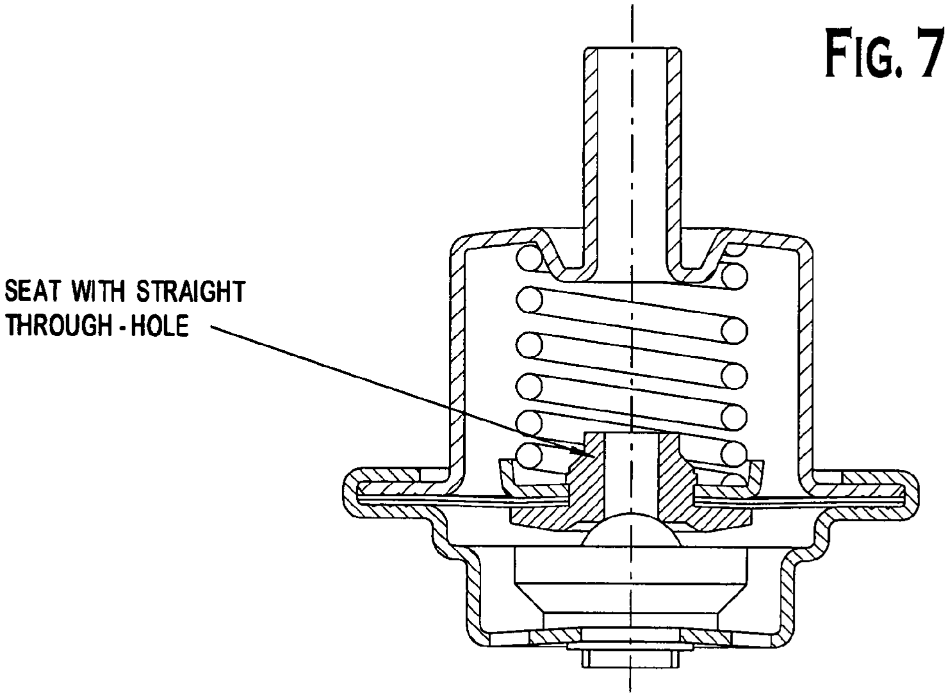
FIG. 7 illustrates a first known pressure regulator.
Figure 8:
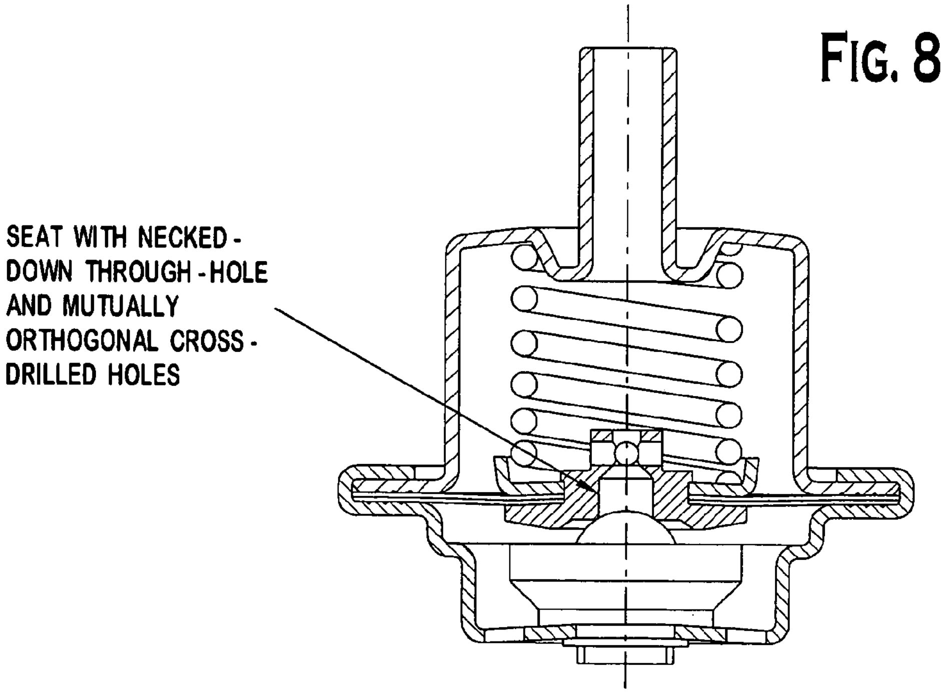
FIG. 8 illustrates a second known pressure regulator.

As shown in FIG. 6, curves B4–B13 show that fuel pressure in the regulator 10 at the maximum fuel flow rate is substantially equal to or less than the fuel pressure at the minimum fuel flow rate. Again, the performance of the regulator 10 is generally consistent with the performance, as illustrated by curves B1–B3, of known pressure regulators that do not have the advantages of pressure regulator 10.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A flow-through pressure regulator, comprising:
- a housing having an inlet and an outlet spaced along a longitudinal axis from the inlet;
- a divider separating the housing into a first chamber and a second chamber, the divider including:
  - a seat defining a passage between the first and second chambers, fluid communication between the first and second chambers through the passage being permitted;
  - a diaphragm extending between the housing and the seat, fluid communication between the first and second chambers through the diaphragm being prevented; and
  - a retainer securing the diaphragm relative to the seat, the retainer including:
    - a cylindrical portion extending about the longitudinal axis and being fixed with respect to the seat; and
    - an axial end portion extending from to cylindrical portion and extending generally orthogonal relative to the longitudinal axis, the axial end portion including a plurality of apertures, fluid communication between the passage and the second chamber through the plurality of apertures being permitted; and a closure member being arranged between first and second configurations relative to the seat, the first configuration substantially preventing fluid communication through the passage, and the second configuration permitting fluid communication through the passage.

2. The flow-through pressure regulator of claim 1, wherein the housing comprises first and second housing parts, the first housing part including the inlet and defining the first chamber, and the second housing part including the outlet and defining the second chamber.

3. The flow-through pressure regulator of claim 2, wherein the diaphragm comprises a first perimeter sandwiched between the first and second housing parts.

4. The flow-through pressure regulator of claim 3, wherein the retainer comprises an annular portion spaced along the longitudinal axis from the axial end portion, the annular portion extending from the cylindrical portion and extending outwardly relative to the longitudinal axis.

5. The flow-through pressure regulator of claim 4, wherein the diaphragm comprises a second perimeter being sandwiched between the seat and the annular portion of the retainer, and the passage being surrounded by the second perimeter.

6. The flow-through pressure regulator of claim 4, comprising:

a resilient element extending along the longitudinal axis and biasing the divider toward the closure member, the resilient element including a first end engaging the second housing part and a second end engaging the annular portion of the retainer.

7. The flow-through pressure regulator of claim 1, wherein the seat, the cylindrical portion, and a longitudinal gap between the seat and the axial end portion of the retainer define a collection chamber in fluid communication between the passage and the plurality of apertures.

8. The flow-through pressure regulator of claim 1, wherein the cylindrical portion of the retainer being press-fitted with respect to the seat.

9. The flow-through pressure regulator of claim 1, wherein the passage comprises first and second portions, the first portion includes a first cross-section orthogonal to the longitudinal axis, and the second portion includes a second cross-section orthogonal to the longitudinal axis, the first portion being located between the second portion and the inlet, the second portion being located between the first portion and the outlet, and the first cross-section being larger than the second cross-section.

10. The flow-through pressure regulator of claim 1, wherein the plurality of apertures comprises a pattern of apertures.

11. The flow-through pressure regulator of claim 10, wherein the pattern of apertures is centered about the longitudinal axis.

12. The flow-through pressure regulator of claim 11, wherein the pattern of apertures comprises a circle.

13. The flow-through pressure regulator of claim 12, wherein the plurality of apertures consists of seven apertures each having a diameter of 1.59.±.0.02 millimeters, and the circle has a diameter of approximately 5.5 millimeters, a first one of the seven apertures being concentric with the longitudinal axis, and a second, third, fourth, fifth, sixth and seventh ones of the apertures lying on the circle and being evenly spaced about the longitudinal axis.

14. The flow-through pressure regulator of claim 13, wherein a ratio of a longitudinal thickness of the axial end portion to the diameter of each aperture being approximately 0.35.

15. The flow-through pressure regulator of claim 1, wherein a number of the plurality of holes, a pattern of the plurality of holes, and a length parallel to the longitudinal axis of the plurality of holes are selected in response to noise and flow characteristics in the second configuration.

16. A retainer for a flow-through pressure regulator, the flow-through pressure regulator including a divider, a seat and a diaphragm, the divider separating a housing into a first chamber and a second chamber, the seat defining a passage between the first and second chambers, and the diaphragm extending between the housing and the seat, the retainer comprising:

a cylindrical portion extending about a longitudinal axis;

an axial end portion extending from the cylindrical portion and extending inwardly relative to the longitudinal axis, and the axial end portion including a plurality of apertures, fluid communication between the passage and the second chamber through the plurality of apertures being permitted; and an annular portion spaced along the longitudinal axis from the axial end portion, the annular portion extending from to cylindrical portion and extending outwardly relative to the longitudinal axis.

17. The retainer of claim 16, wherein the cylindrical portion being adapted to be press-fitted with respect to the seat, and the annular portion being adapted to sandwich the diaphragm with respect to the seat.

18. The retainer of claim 16, wherein the plurality of apertures comprises a pattern of apertures.

19. The retainer of claim 18, wherein the pattern of apertures is centered about the longitudinal axis.

20. The retainer of claim 19, wherein the pattern of apertures comprises a circle.

21. The retainer of claim 20, wherein the plurality of apertures consists of seven apertures each having a diameter of 1.59.±.0.02 millimeters, and the circle has a diameter of approximately 5.5 millimeters, a first one of the seven apertures being concentric with the longitudinal axis, and a second, third, fourth, fifth, sixth and seventh ones of the apertures lying on the circle and being evenly spaced about the longitudinal axis.

22. The flow-through pressure regulator of claim 21, wherein a ratio of a longitudinal thickness of the axial end portion to the diameter of each aperture being approximately 0.35.

* * * * *